(12) United States Patent
Borg et al.

(10) Patent No.: US 10,430,231 B2
(45) Date of Patent: Oct. 1, 2019

(54) METHOD FOR CREATING A HYPERVISOR UNIT FOR EMBEDDED SYSTEMS

(71) Applicant: Robert Bosch GmbH, Stuttgart (DE)

(72) Inventors: Andrew Borg, TT-Woodbrook Port of Spain (GB); Gary Morgan, Thixendale (GB); Holger Broede, Sachsenheim (DE); Jochen Haerdtlein, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 15/309,638

(22) PCT Filed: May 20, 2015

(86) PCT No.: PCT/EP2015/061141
§ 371 (c)(1),
(2) Date: Nov. 8, 2016

(87) PCT Pub. No.: WO2015/177226
PCT Pub. Date: Nov. 26, 2015

(65) Prior Publication Data
US 2017/0161097 A1     Jun. 8, 2017

(30) Foreign Application Priority Data
May 20, 2014   (DE) .................. 10 2014 209 592

(51) Int. Cl.
| | |
|---|---|
| *G06F 9/455* | (2018.01) |
| *G06F 9/48* | (2006.01) |
| *G06F 16/23* | (2019.01) |
| *G06F 9/50* | (2006.01) |
| *B60W 50/00* | (2006.01) |

(Continued)

(52) U.S. Cl.
CPC .............. *G06F 9/48* (2013.01); *B60W 50/00* (2013.01); *G06F 9/223* (2013.01); *G06F 9/30* (2013.01); *G06F 9/45533* (2013.01); *G06F 9/5077* (2013.01); *G06F 16/23* (2019.01)

(58) Field of Classification Search
None
See application file for complete search history.

(56) References Cited

U.S. PATENT DOCUMENTS

2012/0005346 A1   1/2012   Burckart et al.

FOREIGN PATENT DOCUMENTS

| | | |
|---|---|---|
| CN | 101344860 A | 1/2009 |
| CN | 101946243 A | 1/2011 |
| WO | 2006063274 A1 | 6/2006 |

OTHER PUBLICATIONS

Masmano et al; XtratuM Hypervisor for LEON3 vol. 2: User Manual; ai2 Instituto De Automaticae Informatica Industrial; Feb. 2011 (Year: 2011).*

(Continued)

*Primary Examiner* — Bing Zhao
(74) *Attorney, Agent, or Firm* — Norton Rose Fulbright US LLP; Gerard Messina

(57) ABSTRACT

A method for creating a hypervisor unit for a control unit is described. The hypervisor unit is designed to execute two applications on the control unit during a run time. The hypervisor unit is created during a compile time as a function of a first property of the first application, as a function of a second property of the second application, and as a function of a third property of the control unit.

11 Claims, 3 Drawing Sheets

(51) Int. Cl.
*G06F 9/22* (2006.01)
*G06F 9/30* (2018.01)

(56) References Cited

OTHER PUBLICATIONS

ETAS RTA Solutions, "Tailor-made Embedded Software," Feb. 1, 2014, pp. 1-16.
Posch, Torsten, "Separating software worlds in the dashboard," May 19, 2014, pp. 1-14.
International Search Report dated Jul. 20, 2015, of the corresponding International Application PCT/EP2015/061141, filed on May 20, 2015.

* cited by examiner

METHOD FOR CREATING A HYPERVISOR UNIT FOR EMBEDDED SYSTEMS

FIELD

The present invention relates to a method for creating a hypervisor unit and to a hypervisor unit.

BACKGROUND INFORMATION

Conventional hypervisor units are configured during the run time of the hypervisor unit. This means that the existing hypervisor units generate objects or instances for virtual operation environments during the run time in a dynamic manner.

Furthermore, conventional embedded systems generally include microcontrollers.

SUMMARY

Features of example embodiments of the present invention are described herein and are shown in the figures. The features may be important both on their own and in various combinations in the context of the present invention, without any additional specific reference being made in this regard.

Because of the fact that the hypervisor unit in the present method is created during the compile time as a function of properties of applications and as a function of at least one property of the control unit, it is advantageously possible to use only the program code for creating the hypervisor unit that is actually also required during the run time. In the embedded system sector and particularly when using a microcontroller, this provides the special advantage that the limited hardware resources may be utilized in the most optimal manner possible. Money savings can be realized, in particular, because no provisions have to be made for processor cores of unnecessarily large dimensions, for working memories or other hardware resources. The execution time can advantageously be reduced in addition since the properties of the applications and the properties of the control unit are already known prior to the run time of the hypervisor unit and are able to be taken into account.

In an advantageous manner, the configuration of the hypervisor unit during the run time is avoided, so that computing time is available to the applications instead of the hypervisor unit. On account of this saved virtualization step during the run time, this method and the introduced hypervisor can satisfy the real-time demands that predominate in the automotive sector. It can therefore be ensured, for example, that an engine control and an anti-lock braking system control are executed in a safe and reliable manner on the same control unit.

Another advantage is the possibility of reducing the number of control units in the motor vehicle, so that the wiring expense, in particular, can be reduced considerably. Moreover, providing the hypervisor unit makes it possible to reuse already existing software. In the migration of multiple control units to a single control unit, for example, the software of the multiple control units can be used again.

In one advantageous specific development of the method, a virtual system resource is provided for a first system resource of the control unit during the compile time. Because of the virtual system resource, actual or real system resources of the control unit that are accessed by two applications can therefore be virtualized in an advantageous manner. In one advantageous development, the hypervisor unit is created during the compile time, such that only the first application is able to get direct access to a second system resource during the run time, while the second system resource is blocked for the second application during the run time. This is implemented as a function of the first, second and third properties and advantageously ensures exclusive use of the second system resource by the first application, so that only system resources that are used by both applications during the run time must advantageously be virtualized during the compile time.

Further features, application possibilities and advantages of the present invention result from the following description of exemplary embodiments of the present invention, which are illustrated in the figures. All described and illustrated features, either shown on their own or in any combination, form the subject matter of the present invention, regardless of their combination in the patent claims or their antecedent references, and also regardless of their wording or presentation in the description or in the drawing. The same reference numerals are used in all of the figures for functionally equivalent variables and features, even if the specific embodiments differ.

Exemplary specific embodiments of the present invention are discussed below with reference to the figures.

DETAILED DESCRIPTION OF EXAMPLE EMBODIMENTS

Figure 1:
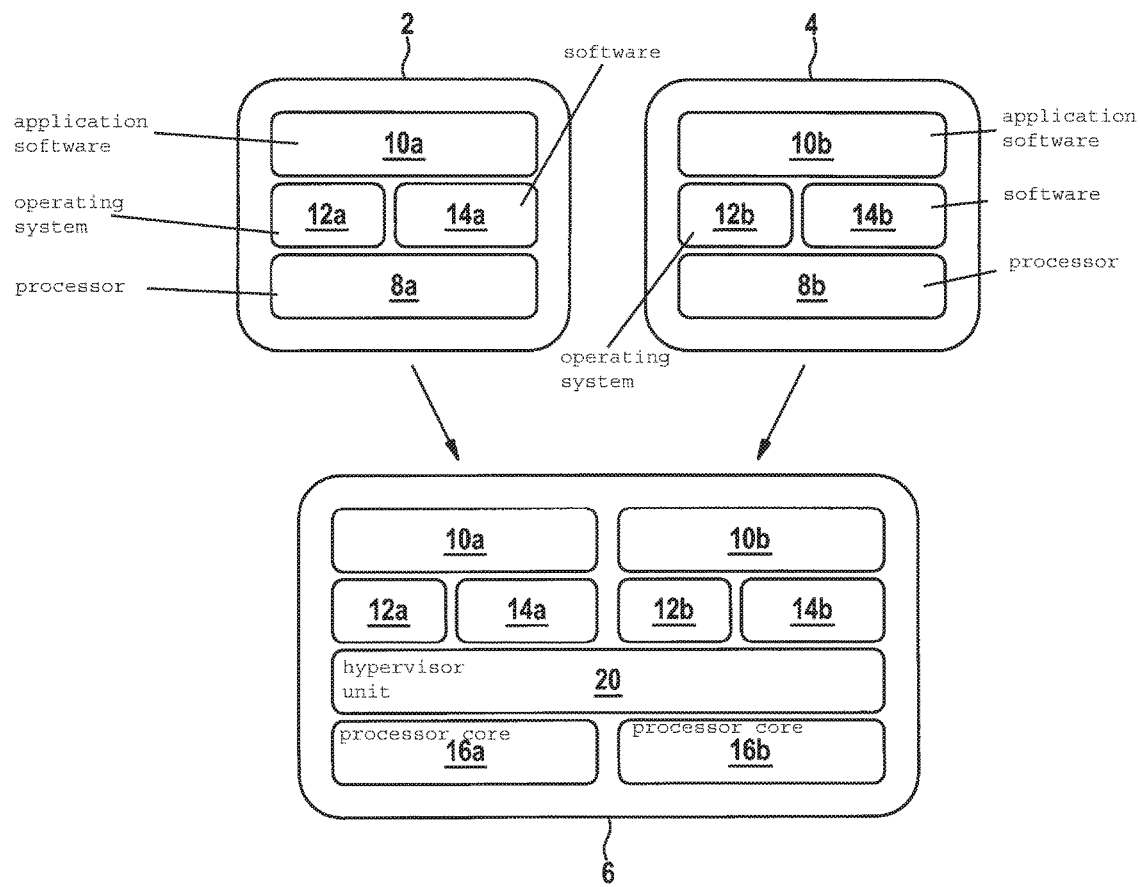
FIG. 1 shows in schematic form, three control units.

FIG. 1 shows three control units 2, 4 and 6. Control units 2 and 4 are control units from the related art, and control unit 6 is a control unit according to the present invention. Control units 2 and 4 include a single processor 8a and 8b in each case. Application software 10a and 10b, which is independent of the control unit, is executed on respective processor 8a, 8b via an operating system 12a, 12b and basic software 14a and 14b specific to the control unit. Control units 2 and 4 are implemented separately and, for example, provide functionalities such as an engine control, a transmission control or an anti-lock braking system functionality.

Control unit 6 according to the present invention, for instance, includes two processor cores 16a and 16b. A hypervisor unit 20 is situated between the computing unit having processor cores 16a and 16b, and application software 10, operating system 12 and basic software 14. This advantageously makes it possible for hypervisor unit 20 to continue to use, or reuse, in control unit 6 already existing software components, such as application software 10, operating system 12 and basic software 14, without any problems. Moreover, only one control unit 6 is required instead of two control units 2 and 4.

Figure 2:
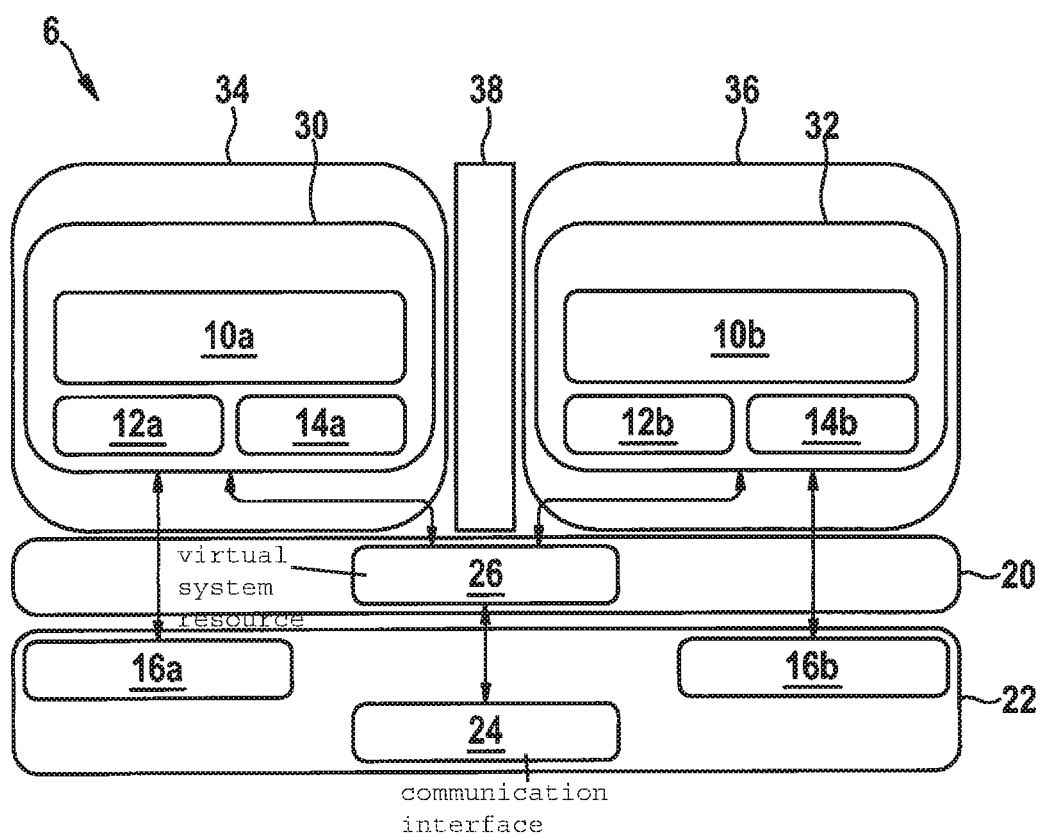
FIG. 2 shows in schematic form, one of the control units.

FIG. 2 shows a control unit 6 in schematic form. A microcontroller unit 22 of control unit 6 is equipped with processor cores 16a and 16b as well as a communications interface 24. Communications interface 24, for example, is an Ethernet interface, a FlexRay interface, or a CAN interface (CAN: Controller Area Network).

Hypervisor unit 20 includes a virtual system resource 26, which provides communications interface 24 of a first application 30 and a second application 32. First application 30 encompasses application software 10a, operating system 12a and basic software 14a. Second application 32 includes application software 10b, operating system 12b, and basic software 14b. First application 30 is executed in a first virtual operating environment 34, while second application form 30 is executed in a second virtual operating environment 36. According to bar 38, hypervisor unit 20 provides a temporal and spatial separation with regard to the execution of the two applications 30 and 32 on microcontroller unit 22 of control unit 6.

Virtual system resource 26 is developed in such a way that access by applications 30, 32 to operating means 24 standing behind virtual operating means 26 is carried out according to a priority-scheduling method. From the point of view of applications 30, 32, each has unrestricted access to an exclusively utilized system resource. In reality, however, system resource 26 is merely a virtual system resource and controls the access of applications 30 and 32 to real system resource 24. Each application 30, 32 is assigned a period length. Applications 30, 32 access the real, actually existing, system resource 24 as a function of the period length with the aid of virtual system resource 26. The shorter the period length of application 30, 32, the higher its priority. An application 30, 32 that is to be executed frequently has a short period length and thus a higher priority. An application 30, 32 having a short period length and/or high priority thus is always able to interrupt an application 30, 32 having a high period length and/or low priority. In addition, virtual system resource 26 has assigned each application 30, 32 minimum time slots at periodic time intervals for access to real, actually existing system resource 24, which ensures a minimum access time per time interval to system resource 24 by respective application 30, 32. With the aid of minimum time slots it is possible to ensure guaranteed access of individual applications 30, 32 to system resource 24, so that they will not be stopped by another application 30, 32.

Communications interface 24 is also referred to as the first system resource of the control unit. To transmit data and to access communications interface 24, virtual system resource 26 makes an arbitration method available, through which virtual system resource 26 coordinates the access of applications 30 and 32 to communications interface 24. To receive data from communications interface 24, virtual system resource 26 of hypervisor unit 20 coordinates the reception of the data from communications interface 24 and the transmission of the data to the individual application 30, 32.

First processor core 16a of microcontroller unit 22 is used only by application 30, which accesses processor core 16a directly. Hypervisor unit 20 ensures that second application 32 will be blocked from accessing first processor core 16a during the run time. Accordingly, hypervisor unit 20 ensures that access to second processor core 16b by first application 30 will be blocked for the duration of the run time.

Hypervisor unit 20 thus provides a virtual system resource 26 to a first system resource 24 that is jointly used by the two applications 30 and 32. For a second resource 16a, which is used only by first application 30, hypervisor unit 20 furthermore blocks access to this second system resource 16a for second application 32.

The coordinated access method, or arbitration method, of virtual system resource 26 for applications 30 and 32 is a priority scheduling method, a round-robin method, or some other arbitration method, for instance. Applications 30 and 32, for example, could be applications that had previously been configured for individual control units. As illustrated in FIG. 2, for instance, applications 30 and 32 can be adopted without modifications provided the corresponding processor core 16a and 16b is essentially the same as that which previously existed on the individual control unit.

Since the required setpoint properties of applications 30 and 32, which are also referred to as first and second properties respectively, and the actual property of control unit 6, which is also referred to as third property, are already known to hypervisor unit 20 prior to the compile time, a hypervisor unit 20 is created in which only system resources are virtualized that are used by two applications 30, 32 during the run time, such as communications interface 24 according to virtual system resource 26.

A further exemplary embodiment is explained on the basis of FIG. 2. Microcontroller unit 22, for instance, includes a processor core 24 and two communications interfaces 16a and 16b. Accordingly, virtual system resource 26 would therefore coordinate the access of applications 30, 32 to the one processor core 24, whereas communications interfaces 16a and 16b are able to be accessed directly through applications 30, 32.

Further exemplary embodiments, in which system resources may be developed in different ways, are possible as well. It is possible, in particular, to subdivide the particular system resources into two categories during the compile time of hypervisor unit 20, the first category identifying a system resource that is used by multiple applications 30, 32 during the run time, and the second category providing direct access to the particular system resource by an individual application 30, 32. For the first category of system resources, hypervisor unit 20 will then be created during the compile time, such that hypervisor unit 20 provides a corresponding virtual system resource 26 for a particular system resource of the first category, and the actual system resource standing behind virtual system resource 26 is able to be used by multiple applications 30, 32 during the run time.

System resources 16a, 16b and 24 may of course also involve a timer component, an analog-to-digital converter, which for instance includes an assigned sensor, a digital-to-analog converter, for example for generating an analog voltage/current signal, or some other peripheral device. System resources 16a, 16b and 24 could naturally also be system resources outside of microcontroller unit 22 to which microcontroller unit 22 has access.

Figure 3:
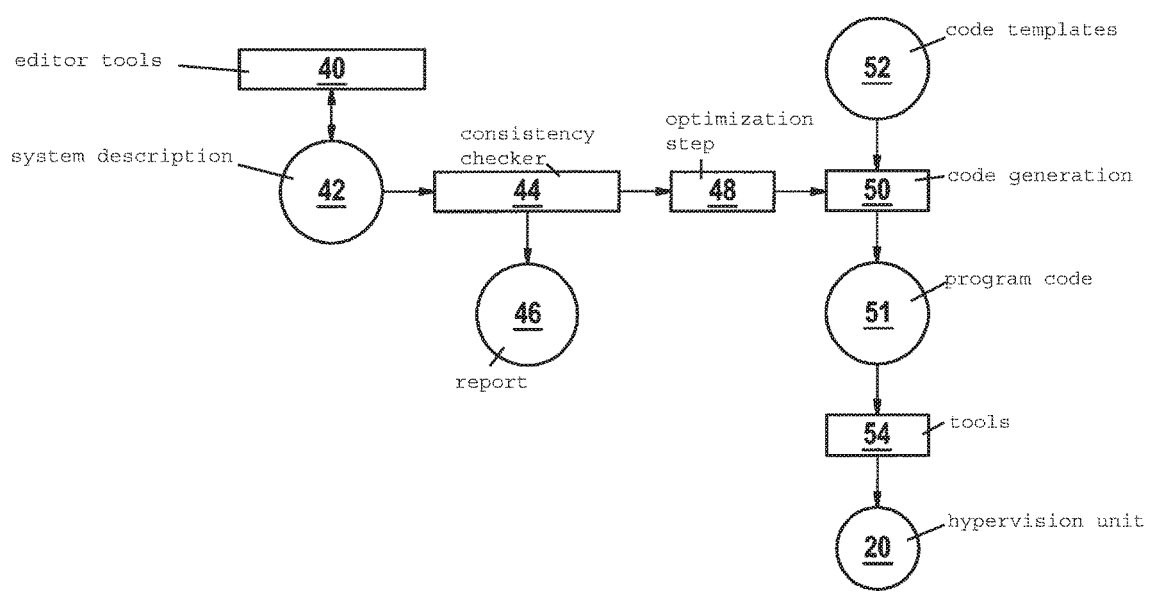
FIG. 3 shows a method for creating a hypervisor unit.

FIG. 3 schematically shows a method for creating hypervisor unit 20. Using suitable editor tools 40, a system description 42 is created or edited. System description 42, in particular, includes the properties of applications 30 and 32 as well as the properties of control unit 6 or microcontroller unit 22. During the compile time, a consistency checker 44 checks system description 42 in order to ascertain whether a contradiction exists between the first property, the second property and the third property. This contradiction is logged according to a report 46, and system description 42 is able to be adapted accordingly on the basis of the report. For example, system description 42 is stored as text or as an XML data set (XML: Extended Mark-up Language). FIG. 3 describes the process of creating hypervisor unit 20 during the compile time.

In optimization step 48, memory areas may be combined, for instance. In a code generation step 50, a program code 51 is generated as a function of code templates 52. Code templates 52 include individual, previously prepared code segments that are generated as a function of applications 30 and 32, i.e. the first and second properties, and as a function of the third property. Program code 51 is compiled and linked with the aid of additional tools 54, and hypervisor unit 20 is created in the process.

With regard to applications 30 and 32, system description 42 includes setpoint demands in the form of the first and second properties. Therein, system description 42 includes an actual configuration according to the third property of control unit 6 or microcontroller unit 22.

What is claimed is:

1. A method for creating a hypervisor unit for a control unit of a motor vehicle, at a compile time, the hypervisor unit being designed to execute two applications on the control unit during a run time, the method comprising:
   creating the hypervisor unit during the compile time as a function of a first property of the first application, as a function of a second property of the second application, and as a function of a third property of the control unit;
   executing, during the compile time, a consistency checker software that ascertains a contradiction between the first property, the second property, and the third property;
   ascertaining a first system resource of the control unit during the compile time as a function of the first, second, and third properties, which is able to be used by the first and the second applications during the run time, and a virtual system resource being created for the first system resource during the compile time, which provides a coordinated arbitration method during the run time for access to the first system resource, the coordinated arbitration method being a priority-scheduling method; and
   ascertaining a second system resource during the compile time as a function of the first, second, and third properties, the second system resource being able to be used only by the first application during the run time, and the hypervisor unit being created during the compile time, in such a way that only the first of the applications has direct access to the second system resource during the run time, and the access to the second system resource is blocked for the second application during the run time.

2. The method as recited in claim 1, further comprising:
   ascertaining a contradiction between a first property, the second property and the third property during the compile time, and logging the contradiction.

3. The method as recited in claim 1, wherein at least one of the first property and the second property includes at least one of: i) a setpoint processor type, ii) a setpoint number of processors, iii) a setpoint memory address, iv) a setpoint memory area, v) a setpoint interrupt configuration, vi) a setpoint communications interface, and vii) a setpoint peripheral device, and wherein the third property includes at least one of: i) an actual processor type, ii) an actual number of processors, iii) an actual memory address, iv) an actual memory area, v) an actual interrupt configuration, vi) an actual communications interface, and vii) an actual peripheral device.

4. A hypervisor unit for a control unit for a motor vehicle, the control unit corresponding to a digital computing unit that includes a microcontroller, the hypervisor unit being designed to execute two applications on the control unit during a run time, wherein the hypervisor unit provides a virtual system resource for a first system resource jointly used by each of the two applications, and for a second system resource which is used only by a first application of the two applications, the hypervisor unit blocks the second system resource for a second application of the two applications for a duration of the run time, and wherein the hypervisor unit includes a consistency checker software that when executed during a compile time ascertains a contradiction between a first property of a first one of the two applications, a second property of a second application of the two applications, and a third property of the control unit, wherein:
   a first system resource of the control unit is ascertained during the compile time as a function of the first, second, and third properties, which is able to be used by the first and the second applications during the run time, and a virtual system resource being created for the first system resource during the compile time, which provides a coordinated arbitration method during the run time for access to the first system resource, the coordinated arbitration method being a priority-scheduling method; and
   a second system resource is ascertained during the compile time as a function of the first, second, and third properties, the second system resource being able to be used only by the first application during the run time, and the hypervisor unit being created during the compile time, in such a way that only the first of the applications has direct access to the second system resource during the run time, and the access to the second system resource is blocked for the second application during the run time.

5. The hypervisor unit as recited in claim 4, wherein the first application accesses the second system resource directly.

6. The hypervisor unit as recited in claim 4, wherein the first and the second application access the first system resource by the virtual system resource of the hypervisor unit according to a coordinated arbitration method, the coordinated arbitration method being a priority scheduling method.

7. The hypervisor unit as recited in claim 4, wherein:
   the second system resource is a first processor core, and
   the first system resource is a communications interface, the communications interface being one of a CAN, FlexRay or Ethernet interface, and
   the second system resource is a first communications interface, the first communications resource being one of a CAN, FlexRay or Ethernet interface, and the first system resource is a first processor core.

8. The hypervisor unit as recited in claim 7, wherein:
   the communications interface is one of a CAN, FlexRay or Ethernet interface.

9. The hypervisor unit as recited in claim 4, wherein:
   the second system resource is a communications interface, and
   the first system resource is a first processor core.

10. The hypervisor unit as recited in claim 9, wherein:
    the communications interface is one of a CAN, FlexRay or Ethernet interface.

11. A control unit for a motor vehicle, the control unit having a digital computing unit configured to execute a hypervisor unit, the hypervisor unit being designed to execute two applications on the control unit during a run time, wherein the hypervisor unit provides a virtual system resource for a first system resource jointly used by each of the two applications, and for a second system resource which is used only by a first application of the two applications, the hypervisor unit blocks the second system resource for a duration of the run time for a second application of the two applications, wherein the digital computing unit is a microcontroller, wherein the hypervisor unit includes a consistency checker software that when executed during a compile time ascertains a contradiction between a first property of a first one of the two applications, a second property of a second application of the two applications, and a third property of the control unit, wherein:
- a first system resource of the control unit is ascertained during the compile time as a function of the first, second, and third properties, which is able to be used by the first and the second applications during the run time, and a virtual system resource being created for the first system resource during the compile time, which provides a coordinated arbitration method during the run time for access to the first system resource, the coordinated arbitration method being a priority-scheduling method; and
- a second system resource is ascertained during the compile time as a function of the first, second, and third properties, the second system resource being able to be used only by the first application during the run time, and the hypervisor unit being created during the compile time, in such a way that only the first of the applications has direct access to the second system resource during the run time, and the access to the second system resource is blocked for the second application during the run time.

\* \* \* \* \*